Patented July 11, 1939

2,165,997

UNITED STATES PATENT OFFICE 2,165,997

PROCESS OF PREPARING FIRE-EXTINGUISHING FOAM

Karl Daimler and Max Paquin, Frankfort-on-the-Main, and Walter Riedelsberger, Bad Soden in Taunus, Germany, assignors to I. G. Farbenindustrie Aktiengesellschaft, Frankfort-on-the-Main, Germany No Drawing. Application March 9, 1935, Serial No. 10,324. In Germany July 12, 1933

5 Claims. (Cl. 23—11)

The present invention relates to fire-extinguishing foam and to a process of preparing it.

Attempts have already been made of utilizing in the manufacture of fire extinguishing air foam the good foaming power which many of the so-called wetting agents possess. As the stability of the foam obtained is generally too small in order to use it for fire-extinguishing purposes, it has already been suggested to apply the foam forming agents together with stabilizing additions.

We have found that with the aid of organic foam forming agents, without any further addition, an excellently stable fire-extinguishing air foam can be produced by adding the foam forming agent in form of a highly concentrated aqueous solution to the water serving for the production of the foam together with air or waste gases. An aqueous solution of a sufficiently high concentration, for instance a solution of 40 to 50 per cent. strength of the foam forming agent is prepared by dissolving the foam forming agent not in water alone, but in a mixture of water and a hydrophilic, that is to say, an organic solvent capable of being mixed with water. The simultaneous use, of the hydrophilic solvent, for the preparation of the highly concentrated solution of the foam forming agent is necessary, because these agents generally yield too viscous solutions in water which, when being used, offer invincible difficulties. It is surprising that by the simultaneous use of a hydrophilic organic solvent for the solution of the foam forming agent the solubility is greatly increased, whereas the viscosity strongly decreases, because the foam forming agents are in general sparingly soluble or insoluble in pure, hydrophilic, organic solvents.

As foam forming agents there may, for instance, be used: the salts of alkylated aromatic sulfonic acids, the salts of sulfonated fatty acids or sulfonated fatty alcohols, or the salts of sulfonated resinous bodies or sulfonic acids in which the sulfo-group is not linked with a fatty or resinous residue directly but in the manner of an ester, ether, amide or amine by means of another organic group; furthermore the bodies obtainable from fatty or resinous residues with polyglycerine or from any organic bodies of high molecular weight and several molecules of ethylene oxide.

As hydrophilic solvents are suitable, for instance alcohols of different kinds and valency, such as methyl alcohol or ethyl alcohol, glycol or glycerin and furthermore esters such as ethyl acetate. The hydrophilic solvents may be used either alone or mixed with each other.

By the above described process a series of products readily accessible to industry may be used for a purpose which nowadays has acquired a particular importance; they essentially facilitate the extinguishing of fire and highly reduce the damage done by water when extinguishing fire.

The following examples serve to illustrate the invention, but they are not intended to limit it thereto, the parts being by weight:

(1) 66 parts of the reaction product of liquid resin acid chloride and sodium hydroxyethanesulfonate (the reaction product being present in the form of an aqueous paste and containing 60 per cent. of dry substance) are converted into a thinly-liquid, clear solution by the addition of 33 parts of alcohol. 1 per cent of this solution is added in known manner, for instance by means of a nozzle, together with air, to the water under pressure and being used for extinguishing fire; there is thus produced a foam of fine bubbles suitable for extinguishing purposes.

(2) 22 parts of a mixture of alkylated and non-alkylated naphthalene-sulfonic acids are neutralized with ammonia and caustic soda solution and mixed with 34 parts of water. After the addition of 16 parts of albumen hydrolysate there are added

| | Parts |
|---|---|
| Alcohol | 9.8 |
| Glycol | 6.9 |
| Ethylacetate | 2.9 |

The substance which at first has a syrup-like consistency becomes thinly-liquid after the addition of the three last-named hydrophilic solvents. No crystals separate even at −10° C. If 1 part of the finished mixture is dissolved in 99 parts of water, 1400 parts by volume of foam are obtained in a usual air foam pump.

We claim:
1. The process which comprises preparing fire- extiguishing foam from a gas, a relatively large quantity of water and a relatively small quantity of a composition comprising a highly concentrated aqueous solution of an organic foam forming agent and a hydrophilic organic solvent which facilitates dissolution of such foam forming agent in water.

2. The process which comprises preparing fire-extinguishing foam from a gas, a relatively large quantity of water and a relatively small quantity of a composition comprising a highly concentrated aqueous solution of an organic foam forming agent and an alcohol.

3. The process which comprises preparing fire-extinguishing foam from a gas, a relatively large quantity of water and a relatively small quantity of a composition comprising a highly concentrated aqueous solution of an organic foam forming agent and ethyl alcohol.

4. The process which comprises preparing fire-extinguishing foam from a gas, a relatively large quantity of water and a relatively small quantity of a composition comprising a highly concentrated aqueous solution of a salt of an alkylated aromatic sulfonic acid and an alcohol.

5. The process which comprises preparing fire-extinguishing foam from a gas, a relatively large quantity of water and a relatively small quantity of a composition comprising a highly concentrated aqueous solution of a salt of an alkylated aromatic sulfonic acid, an albumen hydrolysate, and a mixture of ethyl alcohol, glycol and ethyl acetate.

KARL DAIMLER.
MAX PAQUIN.
WALTER RIEDELSBERGER.